US011165133B2

(12) United States Patent
Lekselius et al.

(10) Patent No.: US 11,165,133 B2
(45) Date of Patent: Nov. 2, 2021

(54) TILT BRACKET FOR ANTENNA STRUCTURE

(71) Applicant: Huawei Technologies Co., Ltd., Shenzhen (CN)

(72) Inventors: Niklas Lekselius, Kista (SE); Erik Penton, Kista (SE); Marcus Lundh, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/018,600

(22) Filed: Sep. 11, 2020

(65) Prior Publication Data

US 2020/0411944 A1 Dec. 31, 2020

Related U.S. Application Data

(63) Continuation of application No. PCT/EP2018/056248, filed on Mar. 13, 2018.

(51) Int. Cl.
| | | |
|---|---|---|
| *H01Q 1/08* | (2006.01) | |
| *H01Q 1/12* | (2006.01) | |
| *F16M 11/10* | (2006.01) | |
| *F16M 13/02* | (2006.01) | |
| *H01Q 3/06* | (2006.01) | |

(52) U.S. Cl.
CPC ............. *H01Q 1/084* (2013.01); *F16M 11/10* (2013.01); *F16M 13/02* (2013.01); *H01Q 1/1228* (2013.01); *H01Q 1/1264* (2013.01); *H01Q 3/06* (2013.01)

(58) Field of Classification Search
CPC .... H01Q 1/084; H01Q 1/1228; H01Q 1/1264; H01Q 1/1242; H01Q 1/246; H01Q 3/02; H01Q 3/04; H01Q 3/06; F16M 11/06; F16M 11/08; F16M 11/10; F16M 11/108; F16M 11/2007; F16M 11/2014; F16M 11/2021; F16M 11/2028; F16M 13/02; F16M 13/022; F16M 2200/00; F16M 2200/02; F16M 2200/21
See application file for complete search history.

(56) References Cited

U.S. PATENT DOCUMENTS

2010/0127946 A1  5/2010  Tung

FOREIGN PATENT DOCUMENTS

| CN | 104022356 A | 9/2014 |
|---|---|---|
| CN | 205944383 U | 2/2017 |
| CN | 107464988 A | 12/2017 |
| CN | 206976559 U | 2/2018 |
| GB | 2505066 A | 2/2014 |
| WO | 2016060305 A1 | 4/2016 |

*Primary Examiner* — Robert Karacsony
(74) *Attorney, Agent, or Firm* — Slater Matsil, LLP

(57) ABSTRACT

A tilt bracket comprising a first bracket part and a second bracket part is pivotable between a fully open position, a fully folded position, and intermediate positions. The tilt bracket further comprises a blocking mechanism which allows the first bracket part and the second bracket part to always pivot towards the fully folded position, and which either prevents or allows the first bracket part and the second bracket part to pivot towards the fully open position.

20 Claims, 6 Drawing Sheets

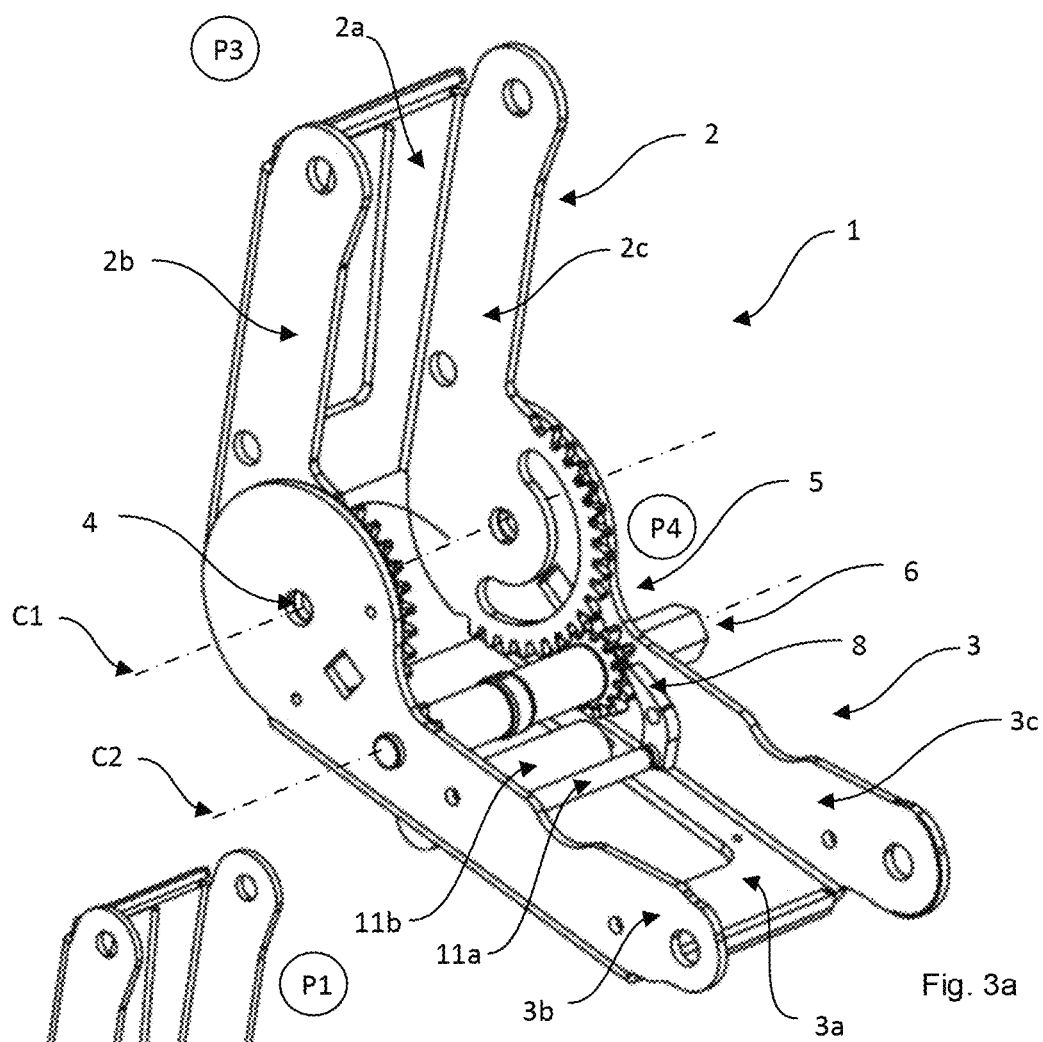
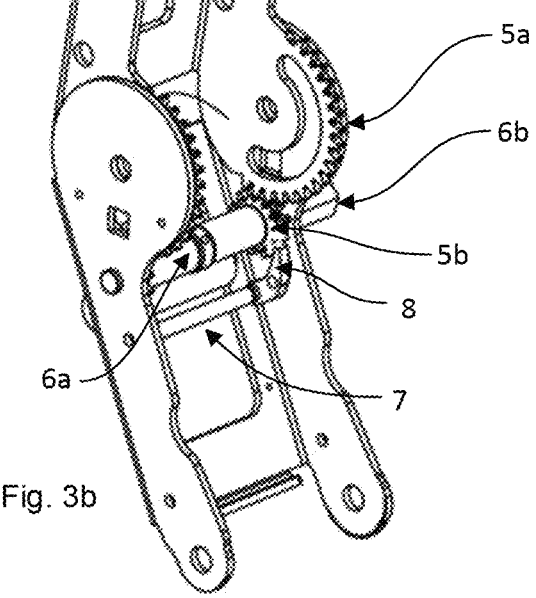
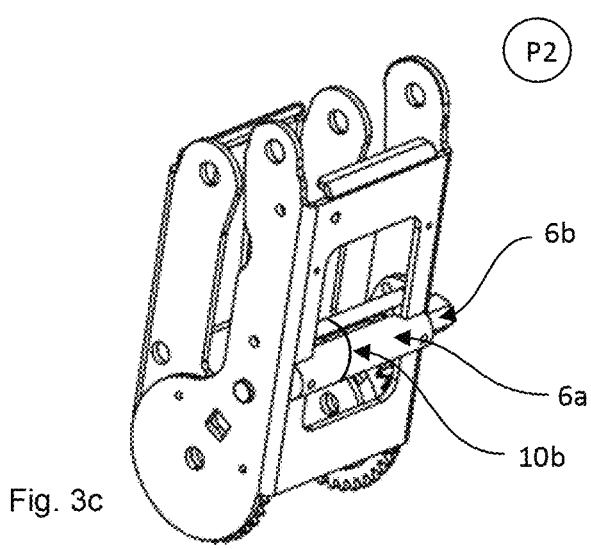
Fig. 3a
Fig. 3b
Fig. 3c

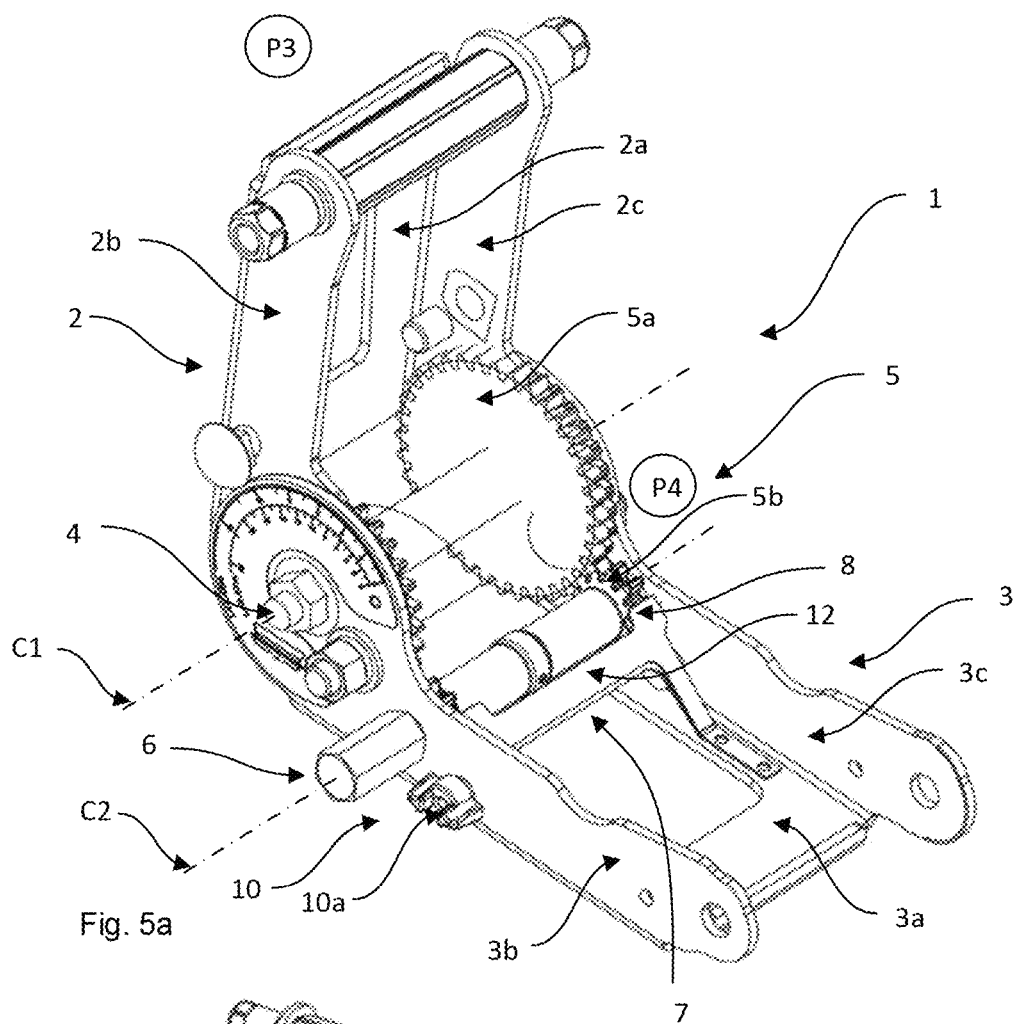
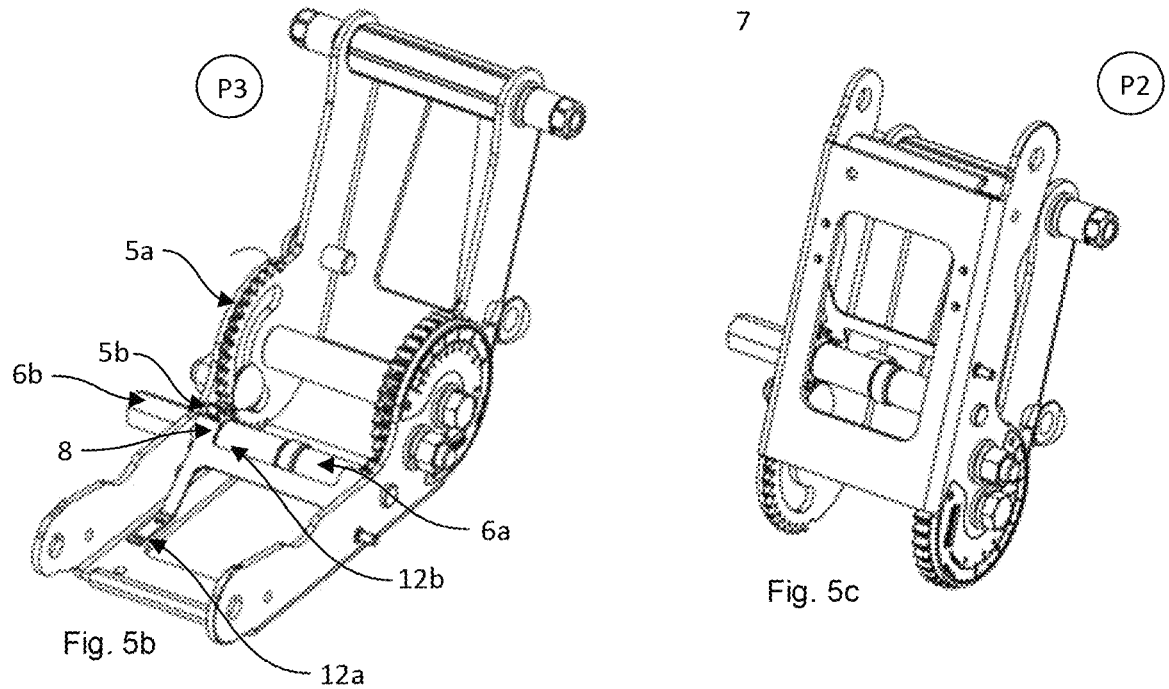

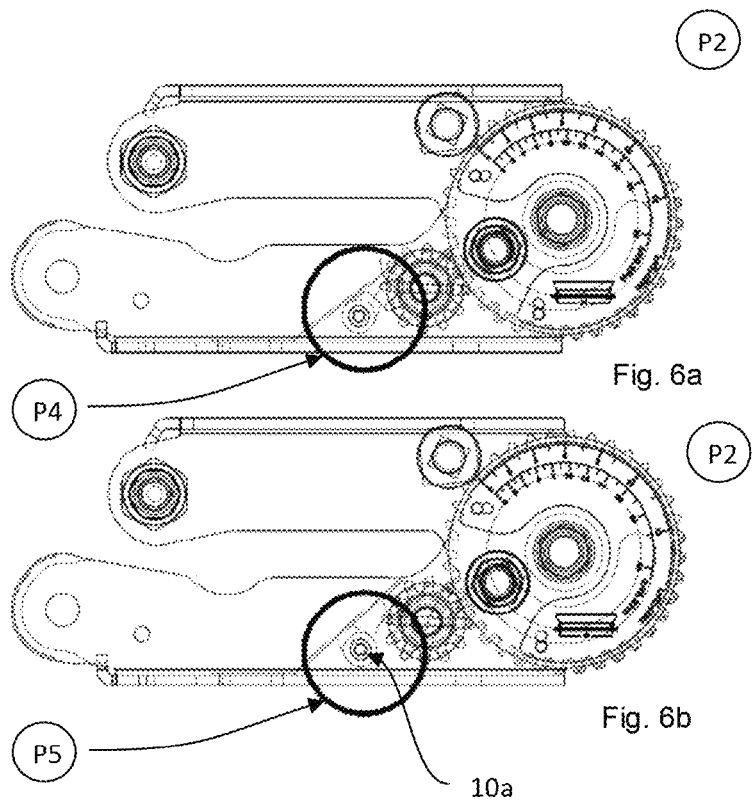
Fig. 6a
Fig. 6b
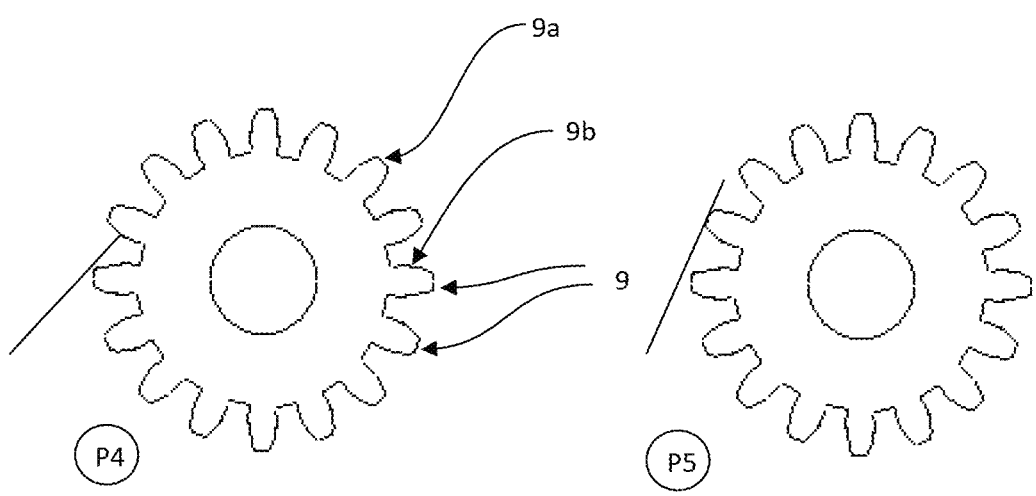
Fig. 7a
Fig. 7b

TILT BRACKET FOR ANTENNA STRUCTURE

CROSS-REFERENCE TO RELATED APPLICATIONS

This application is a continuation of International Application No. PCT/EP2018/056248, filed on Mar. 13, 2018, the disclosure of which is hereby incorporated by reference in its entirety.

TECHNICAL FIELD

The disclosure relates to a tilt bracket comprising a first bracket part and a second bracket part, as well as a pivot means connecting the first bracket part and the second bracket part such that the first bracket part and second bracket part can be pivoted between a fully open position, a fully folded position, and intermediate positions.

BACKGROUND

When mounting a device such as an antenna onto a vertically extending structure such as a building or a pole, the tilt angle of the antenna may have to be considered. One way of accommodating different tilt angles is to attach one end of the antenna to the vertical structure by means of a pivot joint around which the antenna can be pivoted, and to attach the opposite end of the antenna, to the vertical structure, by means of an extendable arm. By manually adjusting the length of the extendable arm, e.g. using a handle, the tilt angle of the antenna can be adjusted.

Antennas, and similar devices, are oftentimes large and heavy, and are often mounted in hard-to-reach areas such as onto a tall building, making both the mounting process and subsequent adjusting of the device difficult. Hence, there is a need for providing means which allow simplified mounting and adjustment of such devices.

SUMMARY

It is an object to provide an improved tilt bracket. The foregoing and other objects are achieved by the features of the independent claims. Further implementation forms are apparent from the dependent claims, the description, and the figures.

According to a first aspect, there is provided a tilt bracket comprising a first bracket part and a second bracket part. A pivot means connects the first bracket part and the second bracket part such that the first bracket part and second bracket part can be pivoted between a fully open position, a fully folded position, and intermediate positions. The tilt bracket also includes a gear mechanism comprising a first cogwheel, the first cogwheel being connected to the first bracket part and sharing a center axis with the pivot means. The tilt bracket also includes a blocking mechanism pivotable between an engaged position and an unengaged position, the blocking mechanism comprising a blocking catch engaging with the gear mechanism when in the engaged position. The blocking mechanism allows the gear mechanism to pivot the first bracket part and the second bracket part towards the fully folded position when the blocking mechanism is in the unengaged position but also when the blocking mechanism is in the engaged position. The blocking mechanism prevents the gear mechanism from pivoting the first bracket part and the second bracket part towards the fully open position when the blocking mechanism is in the engaged position, and the blocking mechanism allows the gear mechanism to pivot the first bracket part and the second bracket part towards the fully open position when the blocking mechanism is in the unengaged position.

A tilt bracket having a gear mechanism which is always movable in a folding direction while being either blocked or movable in the opposite direction, allows the tilt bracket to be set in a fully folded end position and kept that way during mounting, such that the tilt bracket protrudes as little as possible, taking up little room and reducing the risk of the bracket being broken during mounting. Such a gear mechanism also reduces the risk of the tilt bracket opening unexpectedly, allowing the device to drop and possibly hit the installer. Furthermore, the gear mechanism assists in carrying the weight of the device attached to the tilt bracket, making the mounting process less burdensome for the installer, in particular since the installer does not need to use one hand for supporting the antenna at the desired angle while at the same time fixating the tilt bracket in the correct position using the other hand.

In a possible implementation form of the first aspect, the gear mechanism further comprises a second cogwheel, the second cogwheel being connected to the second bracket part, the tilt bracket further comprising a turning mechanism comprising a turning rod connected to, and sharing a center axis with, the second cogwheel, and the blocking catch engaging with the second cogwheel when in the engaged position, facilitating a tilt mechanism which requires less force to be applied by the installer.

In a further possible implementation form of the first aspect, the blocking mechanism is in the engaged position, the blocking catch slides over an apex of a cog of the gear mechanism when the first bracket part and the second bracket part are pivoted towards the fully folded position, and interlocks against a side of a cog of the gear mechanism when the first bracket part and the second bracket part are pivoted towards the fully open position, such that the tilt bracket can be folded together without requiring much force to be applied by the installer while at the same time being held securely in an open position.

In a further possible implementation form of the first aspect, the first bracket part and the second bracket part both comprise a center section and side sections arranged at opposing edges of the center section and extending essentially perpendicular to the center section, the first bracket part folding into the second bracket part when the first bracket part and the second bracket part are pivoted towards the fully folded position, allowing the tilt bracket to have as small outer dimensions as possible when in the fully folded position.

In a further possible implementation form of the first aspect, the tilt bracket further comprises a locking mechanism for locking the blocking mechanism in the unengaged position, allowing the tilt bracket to be moved, from a folded position to a more open position without any interference from other components.

In a further possible implementation form of the first aspect, the locking mechanism extends perpendicular to the side section of the second bracket part and interconnects with the blocking mechanism when the blocking mechanism is in the unengaged position, providing a locking mechanism which is at least partially protected by the second bracket part yet easy to reach and operate by the installer.

In a further possible implementation form of the first aspect, the locking mechanism comprises an asymmetrical knob which, when turned, connects with the blocking mechanism and moves the blocking mechanism to the unengaged position, facilitating a simple yet reliable locking mechanism.

In a further possible implementation form of the first aspect, the blocking mechanism further comprises a first blocking rod connected to the blocking catch and extending in parallel with the turning rod, the blocking mechanism being moved from the engaged position to the unengaged position by moving the first blocking rod in a direction towards the gear mechanism, providing a blocking mechanism which is easy to reach and operate by the installer.

In a further possible implementation form of the first aspect, the blocking catch extends from an end of the first blocking rod, in a direction towards the gear mechanism, and wherein the blocking mechanism is pivotally connected to the side section of the second bracket part, facilitating a simple yet reliable blocking mechanism.

In a further possible implementation form of the first aspect, the blocking mechanism further comprises a second blocking rod extending in parallel with the first blocking rod and the locking mechanism comprises hook means, extending from the first blocking rod and interlocking with the second blocking rod in the unengaged position, allowing the tilt bracket to be released easily from an engaged position and to be, just as easily, maintained in an unengaged position.

In a further possible implementation form of the first aspect, the blocking mechanism comprises a spring-loaded plate, the blocking mechanism being moved from the engaged position to the unengaged position by moving the spring-loaded plate in a direction away from the gear mechanism, providing an inexpensive yet still reliable blocking mechanism.

In a further possible implementation form of the first aspect, one edge of the spring-loaded plate is connected to the center section of the second bracket part and the blocking catch is arranged at an opposite edge of the spring-loaded plate, providing a blocking mechanism which is protected by the bracket parts yet easy to reach and operate by the installer.

In a further possible implementation form of the first aspect, the tilt bracket comprises two interconnected gear mechanisms, the blocking mechanism comprising two interconnected blocking catches, one blocking catch being arranged at each side section of the second bracket part, providing a tilt bracket which is stable and always operates symmetrically.

In a further possible implementation form of the first aspect, the first cogwheel is integral with the side section of the first bracket part, providing a robust and cost-effective tilt bracket.

In a further possible implementation form of the first aspect, first cogwheel is connected to the side section of the first bracket part, allowing an existing, gear-free tilt bracket to be significantly improved by providing it with a gear mechanism.

In a further possible implementation form of the first aspect, the turning mechanism further comprises a turning nut arranged at an outside of the side section of the second bracket part and the second cogwheel is arranged at an inside of the side section of the second bracket part, allowing the tilt bracket to be easily operated by the installer, also from a distance.

According to a second aspect, there is provided a pivotable antenna structure comprising an antenna, a pivot bracket, and the tilt bracket according to the above. The tilt bracket and the pivot bracket are connected to the antenna. The tilt bracket pivots the antenna around the pivot bracket when the first bracket part and the second bracket part are pivoted between the fully open position, the fully folded position, and the intermediate positions. Such an antenna structure is reliable, safe, and easy to operate for the installer, since the tilt bracket has a gear mechanism which is always movable in a folding direction while being either blocked or movable in the opposite direction.

In a possible implementation form of the second aspect, the pivot bracket and the tilt bracket are adapted for being connected to a vertically extending structure, the tilt bracket being arranged at a position which is located vertically above the pivot bracket, allowing the tilt angle of the antenna to be increased only by means of the weight of the antenna.

In a further possible implementation form of the second aspect, the antenna is held at a desired angle, in relation to the vertical structure, by means of the tilt bracket, allowing simple and convenient adjustment of the tilt angle of the antenna.

This and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which:

FIG. 3a shows a perspective view of a tilt bracket in accordance with one embodiment of the present invention arranged in an intermediate position;

FIG. 3b shows the embodiment of FIG. 3a arranged in a fully open position;

FIG. 3c shows the embodiment of FIGS. 3a and 3b arranged in a fully folded position;

FIGS. 5a and 5b show perspective views of a tilt bracket in accordance with a further embodiment of the present invention arranged in an intermediate position;

FIG. 5c shows the embodiment of FIGS. 5a and 5b arranged in a fully folded position;

FIG. 6a shows a side view of the embodiment of FIGS. 5a-5c with a blocking mechanism in an engaged position;

FIG. 6b shows the embodiment of FIG. 6a with the blocking mechanism in an unengaged position;

FIG. 7a shows a schematic side view of a cogwheel in accordance with an embodiment of the present invention with a blocking mechanism in an engaged position;

FIG. 7b shows the embodiment of FIG. 7a with the blocking mechanism in an unengaged position.

DETAILED DESCRIPTION OF ILLUSTRATIVE EMBODIMENTS

Figures 1, 2:
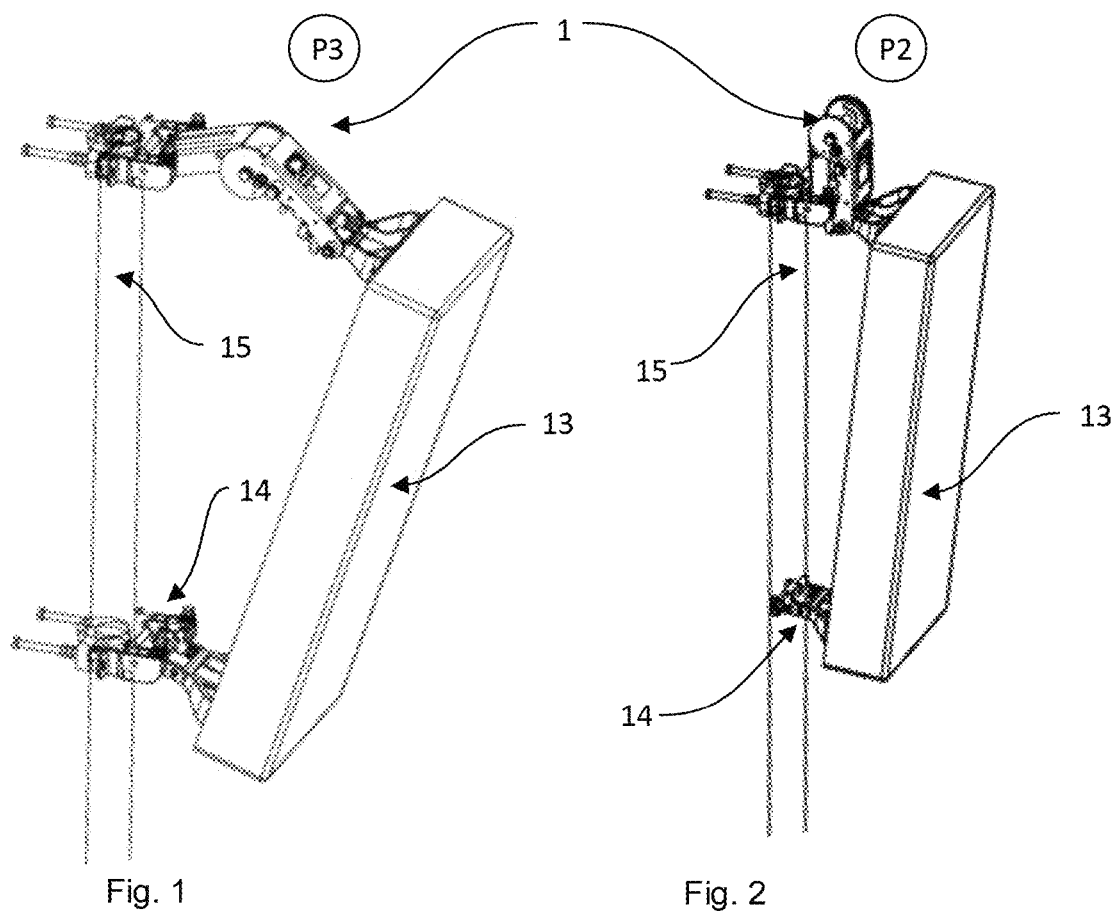
FIG. 1 shows a perspective view of an antenna structure in accordance with one embodiment of the present invention arranged in an intermediate position.
FIG. 2 shows the embodiment of FIG. 1 arranged in a folded position.

FIGS. 3*a-c* and 5*a-c* show a tilt bracket 1 comprising a first bracket part 2 and a second bracket part 3. The bracket parts 2, 3 can be pivoted relative each other between a fully open position P1, a fully folded position P2, and one or several intermediate positions P3.

The first bracket part 2 and the second bracket part 3 are pivotally connected, at one end, by a pivot means 4, such as a shaft extending between opposite side sections 2*b*, 3*b* and 2*c*, 3*c* of both brackets 2, 3 as shown in FIGS. 5*a*-5*b*. Alternatively two individual means (e.g. bolts or screws) could be used only connecting one pair of adjacent side sections 2*b* and 3*b*, or 2*c* and 3*c* e.g. by placing these two individual means in the holes in the side sections 2*b* and 3*b*, or 2*c* and 3*c* as shown in FIGS. 3*a*-3*b*.

The first bracket part 2 comprises a plate shaped center section 2*a*, which may be provided with a through-going opening for accommodating the fingers of an installer and allowing access to the interior of the tilt bracket 1 when the tilt bracket is in the fully folded position. Two side sections 2*b*, 2*c* are arranged at opposing edges of the center section 2*a* and extend in the same direction and essentially perpendicular to the center section 2*a*, such that a cross-section of the first bracket part is U-shaped.

The second bracket part 3 comprises a plate shaped center section 3*a*, which may be provided with a through-going opening for accommodating the fingers of an installer and allowing access to the interior of the tilt bracket 1 when the tilt bracket is in the folded position. Two side sections 3*b*, 3*c* are arranged at opposing edges of the center section 3*a* and extend in the same direction and essentially perpendicular to the center section 3*a*, such that a cross-section of the second bracket part is U-shaped.

The outer width of the first bracket part 2, delimited by side sections 2*b*, 2*c*, is slightly smaller than the inner width of the second bracket part 3, delimited by side sections 3*b*, 3*c*, such that the first bracket part 2 can fold, at least partially, into the second bracket part 3 when the first bracket part 2 and the second bracket part 3 are pivoted towards the fully folded position P2, as shown in FIGS. 3*c* and 5*c*.

The tilt bracket 1 further comprises a gear mechanism 5 comprising a first cogwheel 5*a*. The first cogwheel 5*a* is preferably connected to the side sections 2*b*, 2*c* of the first bracket part 2 and shares a center axis C1 with the pivot means 4.

The first cogwheel 5*a* may be integral with the side section 2*b*, 2*c* of the first bracket part 2, or it may be a separate component fixedly connected to the side section 2*b*, 2*c* of the first bracket part 2. When the first cogwheel 5*a* is a separate component, it preferably extends in parallel with the side section 2*b*, 2*c* and is fixedly connected to the inside of the side section 2*b*, 2*c* of the first bracket part 2, i.e. to the side of the side section 2*b*, 2*c* which faces the opposite side section 2*c*, 2*b*.

The gear mechanism 5 may further comprise a second cogwheel 5*b* which is, preferably, pivotally connected to the inside of the side section 3*b,c* of the second bracket part 3, i.e. to the side of the side section 3*b,c* which faces the opposite side section 3*c*, 3*b*. The second cogwheel 5*b* extends in parallel with the side section 3*b*, 3*c*.

The cogs 9 on the first cogwheel 5*a* mesh with the cogs 9 on the second cogwheel 5*b*, and as the cogwheels 5*a*, 5*b* are rotated, the bracket parts 2, 3 are pivoted relative each other between a fully open position P1, a fully folded position P2, and one or several intermediate positions P3. In the fully open position P1, the first bracket part 2 and the second bracket part 3 extend, from the pivot means and its center axis C1, such that the angle between the bracket parts 2, 3 is approximately 180°. In the fully folded position P2, the first bracket part 2 and the second bracket part 3 overlap and extend essentially in parallel with each other such that the angle between the bracket parts 2, 3 is approximately 0°. By intermediate position P3 is meant any possible position and angle therebetween.

The gear mechanism 5 is connected to a turning mechanism 6, such that an installer can operate the tilt bracket 1, i.e. moving the first bracket part 2 and the second bracket part 3 between positions P, P2, and P3, by turning the turning mechanism 6. The turning mechanism 6 comprises a turning rod 6*a* which is fixedly connected to, and which shares a center axis C2 with, the second cogwheel 5*b*, as shown in FIGS. 3*a* and 5*a*. The center axes C1 and C2 extend in parallel and perpendicular to the side sections 2*b*, 2*c*, 3*b*, 3*c*.

The turning mechanism 6 further comprises a turning nut 6*b* arranged at the outside of the side section 3*b,c* of the second bracket part 3, such that the second cogwheel 5*b* is arranged at one side of the side section 3*c*, 3*b* and the turning nut 6*b* is arranged at the opposite side of the side section 3*c*, 3*b*. The turning rod 6*a* extends from the turning nut 6*b*, through one side section 3*b,c* and across to, and preferably at least partially through, the opposite side section 3*c*, 3*b*. The turning nut is designed such that it interlocks with a conventional tool such as, e.g., a wrench.

Figure 4:
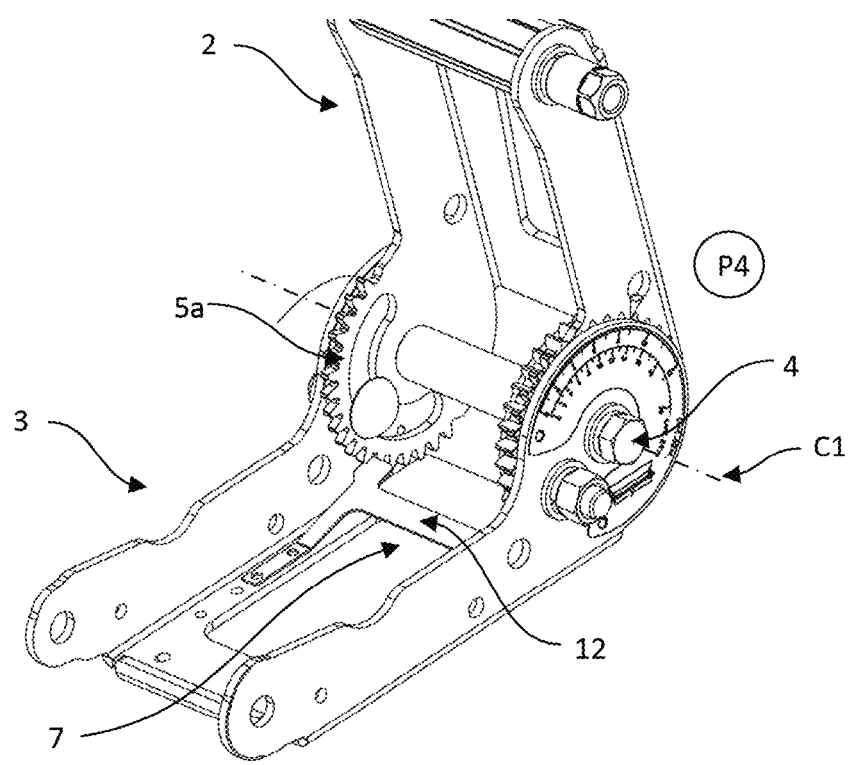
FIG. 4 shows a perspective view of a tilt bracket in accordance with a further embodiment of the present invention arranged in an intermediate position.

The tilt bracket 1 further comprises a blocking mechanism 7 which is pivotable between an engaged position P4 and an unengaged position P5. The blocking mechanism is maintained in the engaged position P4 as long as no additional force is applied onto it. The blocking mechanism 7 comprises a blocking catch 8 which engages with the second cogwheel 5*b*, as shown in FIGS. 3*a* and 5*a*, or with the first cogwheel 5*a*, as shown in FIG. 4, when in the engaged position P4, Correspondingly, the second cogwheel 5*b* of the first cogwheel 5*a* is allowed to rotate freely when in the unengaged position P5, as shown in FIGS. 8*a*-8*d*. For the sake of simplicity, the blocking mechanism 7 will be described with reference to the embodiments shown in FIGS. 3*a*-3*c* and 5*a*-5*c*. However, the below description applies also to the embodiment shown in FIG. 4, with the blocking mechanism 7 engaging directly with the first cogwheel 5*a* instead of with the second cogwheel 5*b*.

The blocking mechanism 7 is arranged such that it allows the gear mechanism 5 to pivot the first bracket part 2 and the second bracket part 3 towards the fully folded position P2, or any increasingly more folded intermediate position P3, when the blocking mechanism 7 is in the unengaged position P5 as well as in the engaged position P4. Hence, the tilt bracket 1 can always be folded together. However, the blocking mechanism 7 prevents the gear mechanism 5 from pivoting the first bracket part 2 and the second bracket part 3 towards the fully open position P1, or any increasingly open intermediate position P3, when the blocking mechanism 7 is in the engaged position P4. In order for gear mechanism 5 to pivot the first bracket part 2 and the second bracket part 3 towards the fully open position P1, the blocking mechanism 7 has to be in the unengaged position P5.

The tilt bracket 1 may comprise either one gear mechanism 5, arranged at one pair of adjacent side sections 2b, 3b or 2c, 3c, or it may comprise two interconnected gear mechanisms 5, one gear mechanism 5 being arranged at each pair of adjacent side sections 2b,3b as well as 2c, 3c. The blocking mechanism 7 of the latter embodiment is preferably provided with two interconnected blocking catches 8, each blocking catch 8 being arranged to interlock with each second cogwheel 5b, as seen in FIG. 5b.

The blocking catch 8 is arranged such that it extends at an angle to the periphery of the second cogwheel 5b, such that it, when in the engaged position P4, extends essentially tangentially to the second cogwheel 5b. The front edge of the blocking catch 8 engages with the side 9b of a cog 9 on the second cogwheel 5b, see FIG. 7a, preventing the second cogwheel 5b from rotating in a direction towards the blocking catch 8, such that if the installer attempts to pivot the first bracket part 2 and the second bracket part 3 towards the fully open position P1, the gear mechanism 5 doesn't move. However, the blocking catch 8 slides over the apex 9a of the cog 9 when the second cogwheel 5b is rotated in the opposite direction, see. FIG. 7b, i.e. in a direction from the blocking catch 8, e.g. when the installer attempts to pivot the first bracket part 2 and the second bracket part 3 towards the fully folded position P2.

As shown in FIGS. 3a-3c, the blocking mechanism 7 may comprise a first blocking rod 11a extending in parallel with the turning rod 6a and being connected to the blocking catch 8. The first blocking rod 11a extends between the side sections 3b,c of the second bracket part 3, and one blocking catch 8 extends from one or both ends of the first blocking rod 11a, in parallel with the side sections 3b,c and in a plane perpendicular to the center axis of the first blocking rod 11a, i.e. in a general direction towards the second cogwheel 5b.

A center part of the blocking catch 8 is pivotally connected to a side section 3b, 3c such that the blocking mechanism 7 can be pivoted around said connection, the blocking catch 8 being moved in a direction from the second cogwheel 5b when the first blocking rod 11a is pushed in a direction towards the second cogwheel 5b, and oppositely, the blocking catch 8 being moved in a direction towards the second cogwheel 5b when the first blocking rod 11a is released or actively pulled in a direction from the second cogwheel 5b. In other words, the blocking mechanism 7 is moved from the engaged position P4 to the unengaged position P5 by moving, i.e. pushing, the first blocking rod 11a in a direction towards the second cogwheel 5b.

The blocking mechanism 7 may also comprise a second blocking rod 11b extending in parallel with the turning rod 6a and between the side sections 3b,c of the second bracket part 3. The second blocking rod 11b is located between the first blocking rod 11a and the second cogwheel 5b such that the first blocking rod 11a is pushed in a direction towards the second blocking rod 11b when the blocking mechanism 7 is moved from the engaged position P4 to the unengaged position P5.

As shown in FIGS. 5a-5c, the blocking mechanism 7 may instead comprise a spring-loaded plate 12. One edge 12a of the spring-loaded plate 12 is connected to the center section 3a of the second bracket part 3, such that the main plane of the spring-loaded plate 12 extends at an angle from the center section 3a towards the periphery of the second cogwheel 5b. The blocking catch 8 is arranged at the opposite edge 12b of the spring-loaded plate 12, i.e. the edge which is closest to the second cogwheel 5b. The blocking catch 8 protrudes as an extension of the spring-loaded plate such that the plate 12 may have the shape of an H, where the upper ends of the legs of the H comprise the blocking catches 8 and the lower ends of the legs of the H are fixedly connected to the center section 3a of the second bracket part 3. The lower ends of the legs of the H may be bent in relation to the remainder of the plate such that the lower ends extend in parallel with the center section 3a of the second bracket part 3.

The blocking mechanism 7 shown in FIGS. 5a-5c is pivoted around said fixed connection, when moving between the engaged position P4 and the unengaged position P5. The blocking catch 8 is moved in a direction from the second cogwheel 5b as the edge 12b of the spring-loaded plate 12 is pulled in a direction from the second cogwheel 5b, and the blocking catch 8 is moved in a direction towards the second cogwheel 5b when the edge 12b of the spring-loaded plate 12 is released or pushed towards the second cogwheel 5b. In other words, the blocking mechanism 7 is moved from the engaged position P4 to the unengaged position P5 by moving, i.e. pulling on, the edge 12b of the spring-loaded plate 12 in a direction from the second cogwheel 5b.

The installer can move the blocking mechanism 7 manually to an unengaged position P5. As mentioned above, this can be done by pushing a section of the blocking mechanism in a direction towards the second cogwheel 5b, for the embodiment shown in FIGS. 3a-3c, or by pulling the blocking mechanism 7 in a direction from the second cogwheel 5b, for the embodiment shown in FIGS. 5a-5c.

However, the tilt bracket 1 preferably also comprises a locking mechanism 10 which may be used for locking the blocking mechanism 7 in the unengaged position P5, such that the installer does not have to move, or hold, the blocking mechanism manually.

Figure 8A:
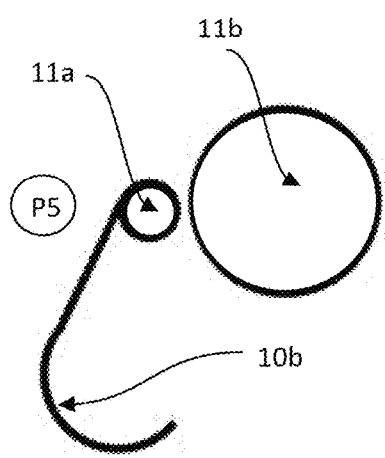
FIG. 8a shows a schematic side view of a locking mechanism in accordance with an embodiment of the present invention.

The locking mechanism 10 may comprise hook means 10b which extends from the first blocking rod 11a, perpendicular to the center axis of the first blocking rod 11a, and connects with the second blocking rod 11b in the unengaged position P5, by hooking around it as shown in FIGS. 3c and 8a.

The locking mechanism 10 may further extend from, and perpendicular to, the side section 3b,c of the second bracket part 3 and be adapted for interconnecting with the blocking mechanism 7 when the blocking mechanism 7 is in the engaged position P4 and moving the blocking mechanism 7 to the engaged position P5.

As shown in FIGS. 5a, 6a, and 6b, the locking mechanism 10 may comprise an asymmetrical knob 10a which, when turned, connects with the blocking mechanism 7 and moves the blocking mechanism 7 to the unengaged position P5. The asymmetrical knob 10a extends through the side section 3b,c of the second bracket part 3, and may be pivoted manually by the installer from the outside of the second bracket part 3 while it connects with the blocking mechanism 7 on the inside of the second bracket part 3. FIGS. 5a, 6a, and 6b show the asymmetrical knob 10a in contact with the spring-loaded plate 12, but it could also be used together with the embodiment shown in FIGS. 3a-3c, the asymmetrical knob 10a in that case being in contact with the end of the blocking catch 8 which is adjacent the first blocking rod 11a.

Figure 8B:
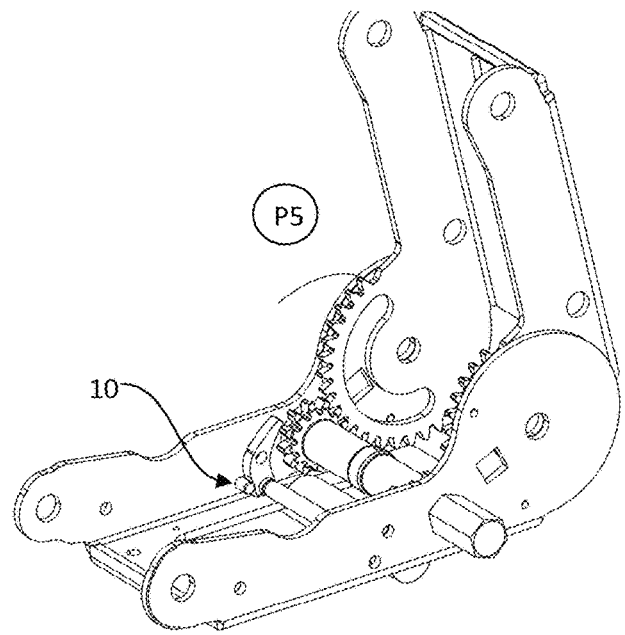
FIG. 8b shows a perspective view of a locking mechanism in accordance with a further embodiment of the present invention.

The locking mechanism 10 may also comprise an elongate pin, extending through the side section 3b,c, as shown in FIG. 8b. The pin is movable between a position where it protrudes towards the exterior of the second bracket part 3, and does not affect the position of the blocking mechanism 7, and a position where it protrudes towards the exterior of the second bracket part 3, and may be used for locking the blocking mechanism 7 in the unengaged position P5. When locking in the unengaged position P5, the pin will be in contact with the end of the blocking catch 8 which is adjacent the first blocking rod 11a.

Figure 8C:
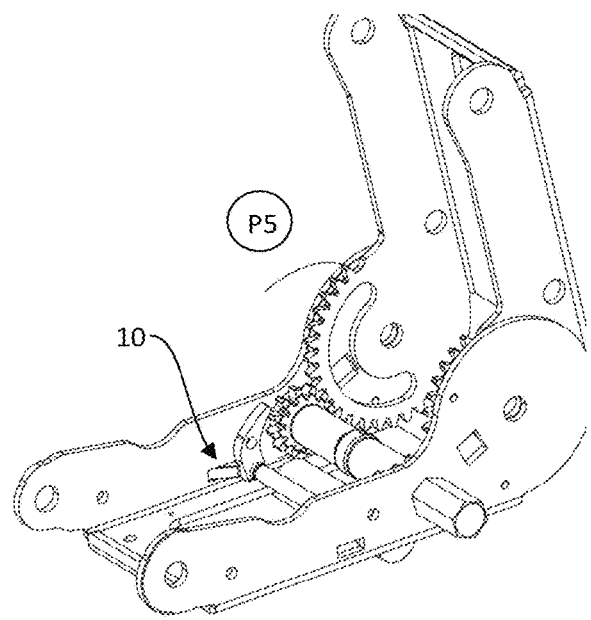
FIG. 8c shows a perspective view of a locking mechanism in accordance with a further embodiment of the present invention.

The locking mechanism 10 may also comprise a triangular catch, extending through the side section 3b, 3c, as shown in FIG. 8c. The catch is pivotable between a position where it protrudes towards the exterior of the second bracket part 3, and does not affect the position of the blocking mechanism 7, and a position where it protrudes towards the exterior of the second bracket part 3, and may be used for locking the blocking mechanism 7 in the unengaged position P5. When locking in the unengaged position P5, the pin will be in contact with the end of the blocking catch 8 which is adjacent the first blocking rod 11a.

Figure 8D:
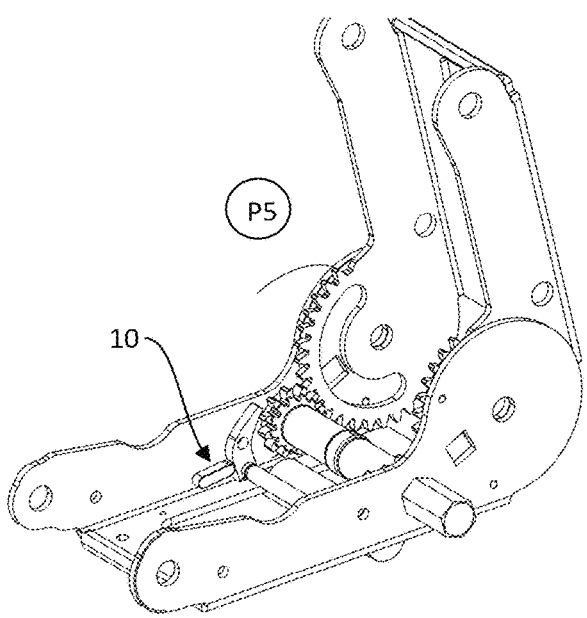
FIG. 8*d* shows a perspective view of a locking mechanism in accordance with a further embodiment of the present invention.

The locking mechanism 10 may furthermore comprise an elongate pin, connected to and extending in parallel with the side section 3b,c, as shown in FIG. 8d. The pin is pivotable around one of its ends, between a position where it, e.g., extends in parallel with the blocking mechanism 7 and therefore does not affect the position of the blocking mechanism 7, and a position where it extends towards the blocking mechanism 7, and may be used for locking the blocking mechanism 7 in the unengaged position P5. When locking in the unengaged position P5, the pin will be in contact with the end of the blocking catch 8 which is adjacent the first blocking rod 11a.

FIGS. 1 and 2 show a pivotable antenna structure comprising an antenna 13, a pivot bracket 14, and the tilt bracket 1 as described above. The denomination "antenna" is not intended as a strict limitation, but to include one and several antennas as well as any kind of device which is complicated to mount in a hard-to-reach area, and especially to mount at a specific angle. The tilt bracket 1 and the pivot bracket 14 are connected to the antenna 13 such that the tilt bracket 1 pivots the antenna 13 around the pivot bracket 14 when the first bracket part 2 and the second bracket part 3 are pivoted between the fully open position P1, the fully folded position P2, and the intermediate positions P3.

The pivot bracket 14 and the tilt bracket 1 are adapted for being connected to a vertically extending structure 15, such as a building or a pole. The antenna 13 is moved to, and held at, a desired angle, in relation to the vertical structure 15, by means of the tilt bracket 1. The tilt bracket 1 is preferably arranged at a position which is located vertically above the pivot bracket 14, such that the weight of the antenna 13 aids in moving the first bracket part 2 and the second bracket part 3 towards the fully open position.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A tilt bracket comprising
a first bracket part and a second bracket part;
a connector connecting the first bracket part and the second bracket part in a manner that the first bracket part and second bracket part are pivotable between a fully open position, a fully folded position, and intermediate positions;
a gear comprising a first cogwheel, wherein the first cogwheel is connected to the first bracket part and shares a center axis with the connector; and
a blocking device pivotable between an engaged position and an unengaged position, wherein the blocking device comprises a blocking catch that is configured to engages with the gear when the blocking device is in the engaged position, the blocking device is configured to allow the gear to pivot the first bracket part and the second bracket part towards the fully folded position when the blocking device is in the unengaged position and when the blocking device is in the engaged position, wherein the blocking device is configured to prevent the gear from pivoting the first bracket part and the second bracket part towards the fully open position when the blocking device is in the engaged position, and wherein the blocking device is configured to allow the gear to pivot the first bracket part and the second bracket part towards the fully open position when the blocking device is in the unengaged position.

2. The tilt bracket according to claim 1, wherein:
the gear further comprises a second cogwheel, the second cogwheel being connected to the second bracket part;
the tilt bracket further comprises a turning device comprising a turning rod connected to, and sharing a center axis with, the second cogwheel; and
the blocking catch is configured to engage with the second cogwheel when in the engaged position.

3. The tilt bracket according to claim 2, wherein the blocking device further comprises a first blocking rod connected to the blocking catch and extending in parallel with the turning rod, and the blocking device is configured to move from the engaged position to the unengaged position by moving the first blocking rod in a direction towards the gear.

4. The tilt bracket according to claim 3, wherein the blocking catch extends from an end of the first blocking rod in a direction towards the gear, and wherein the blocking device is pivotally connected to a side section of the second bracket part.

5. The tilt bracket according to claim 3, wherein the blocking device further comprises a second blocking rod extending in parallel with the first blocking rod, and the blocking device further comprises a lock comprising a hook extending from the first blocking rod and configured to interlock with the second blocking rod in the unengaged position.

6. The tilt bracket according to claim 3, wherein the turning device further comprises a turning nut arranged at an outside of a side section of the second bracket part, and the second cogwheel is arranged at an inside of the side section of the second bracket part.

7. The tilt bracket according to claim 1, wherein, when the blocking device is in the engaged position, the blocking catch is configured to slide over an apex of a cog of the gear when the first bracket part and the second bracket part are pivoted towards the fully folded position, and the blocking catch is configured to interlock against a side of a cog of the gear when the first bracket part and the second bracket part are pivoted towards the fully open position.

8. The tilt bracket according to claim 1, wherein:
the first bracket part comprises a first center section and first side sections arranged at opposing edges of the first center section and extending essentially perpendicular to the first center section;
the second bracket part comprises a second center section and second side sections arranged at opposing edges of the second center section and extending essentially perpendicular to the second center section; and the first bracket part is configured to fold into the second bracket part when the first bracket part and the second bracket part are pivoted towards the fully folded position.

9. The tilt bracket according to claim 8, wherein the tilt bracket further comprises another gear, the gear and the another gear are interconnected, the blocking device further comprises another block catch, the blocking catch and the another blocking catch are interconnected, and the blocking catch and the another blocking catch are arranged at each second side section of the second side sections of the second bracket part.

10. The tilt bracket according to claim 8, further comprising a lock configured to lock the blocking device in the unengaged position.

11. The tilt bracket according to claim 10, wherein the lock is configured to extend in a perpendicular direction with respect to the second side sections of the second bracket part, and to interconnect with the blocking device, when the blocking device is in the unengaged position.

12. The tilt bracket according to claim 11, wherein the lock comprises an asymmetrical knob configured to, when the asymmetrical knob is turned, connect with the blocking device and moves the blocking device to the unengaged position.

13. The tilt bracket according to claim 1, wherein:
the blocking device comprises a spring-loaded plate; and
the blocking is configured to move from the engaged position to the unengaged position by moving the spring-loaded plate in a direction away from the gear.

14. The tilt bracket according to claim 13, wherein an edge of the spring-loaded plate is connected to a center section of the second bracket part and the blocking catch is arranged at an opposite edge of the spring-loaded plate.

15. The tilt bracket according to claim 1, wherein the first cogwheel is integral with a side section of the first bracket part.

16. The tilt bracket according to claim 1, wherein the first cogwheel is connected to a side section of the first bracket part.

17. An antenna structure, comprising:
an antenna;
a pivot bracket; and
a tilt bracket, the tilt bracket and the pivot bracket being connected to the antenna, the tilt bracket being configured to pivot the antenna around the pivot bracket when a first bracket part and a second bracket part are pivoted between a fully open position, a fully folded position, and intermediate positions;

wherein the tilt bracket comprises:
the first bracket part and the second bracket part,
a connector connecting the first bracket part and the second bracket part in a manner that the first bracket part and second bracket part are pivotable between the fully open position, the fully folded position, and the intermediate positions;
a gear comprising a first cogwheel, wherein the first cogwheel is connected to the first bracket part and shares a center axis with the connector; and
a blocking device pivotable between an engaged position and an unengaged position, the blocking device comprising a blocking catch configured to engage with the gear when the blocking device is in the engaged position, the blocking device is configured to allow the gear to pivot the first bracket part and the second bracket part towards the fully folded position when the blocking device is in the unengaged position and when the blocking device is in the engaged position, the blocking device is configured to prevent the gear from pivoting the first bracket part and the second bracket part towards the fully open position when the blocking device is in the engaged position, and the blocking device is configured to allow the gear to pivot the first bracket part and the second bracket part towards the fully open position when the blocking device is in the unengaged position.

18. The antenna structure according to claim 17, wherein the pivot bracket and the tilt bracket are adapted for being connected to a vertically extending structure, the tilt bracket being arranged at a position which is located vertically above the pivot bracket.

19. The antenna structure according to claim 18, wherein the antenna is configured to be held at a target angle, in relation to the vertically extending structure, by the tilt bracket.

20. The antenna structure according to claim 17, wherein:
the gear further comprises a second cogwheel, the second cogwheel being connected to the second bracket part; and
the tilt bracket further comprises a turning device comprising a turning rod connected to, and sharing a center axis with, the second cogwheel, and the blocking catch is configured to engage with the second cogwheel when in the engaged position.

* * * * *